INVENTOR,
DENNIS POCHMERSKI
BY
Harry M. Saragovitz
ATTORNEY.

United States Patent Office 2,967,995
Patented Jan. 10, 1961

2,967,995

APPARATUS FOR MEASURING THE EQUIVALENT ELECTRICAL PARAMETERS OF CRYSTAL UNITS

Dennis Pochmerski, Freehold, N.J., assignor to the United States of America as represented by the Secretary of the Army Filed Aug. 26, 1957, Ser. No. 680,369

4 Claims. (Cl. 324—56)

(Granted under Title 35, U.S. Code (1952), sec. 266)

The invention described herein may be manufactured and used by or for the Government for governmental purposes without the payment of any royalty thereon.

This invention relates to simplified methods of measuring the electrical parameters of crystal units. In the usual systems of measuring the electrical parameter of crystal units it has been the common practice to provide a variable frequency oscillator which can be adjusted to the same frequency as the crystal unit under test and apply the output from such oscillator thru suitable measuring circuits to the crystal. Unless the operating frequency of the crystal were already known it would be necessary either to determine such frequency separately or to make a number of different measurements until the operating frequency could be determined by analysis with sufficient accuracy so that the full range of measurements at the operating frequency could be made.

In the present invention the crystal under test is connected in such a way that it serves as the frequency control for the oscillator supplying the test energy as well as the load for such oscillator connected thru the necessary measuring circuits. In this way the testing operation and also the apparatus are considerably simplified and, since the crystal under test itself determines the oscillator frequency, there is no problem resulting from a drift in frequency of the oscillator driving circuit.

An object of this invention is to simplify the apparatus and method required for testing of frequency controlling crystals. Other objects of the invention will be apparent from the following description and accompanying drawings, in which.

Figure 1:
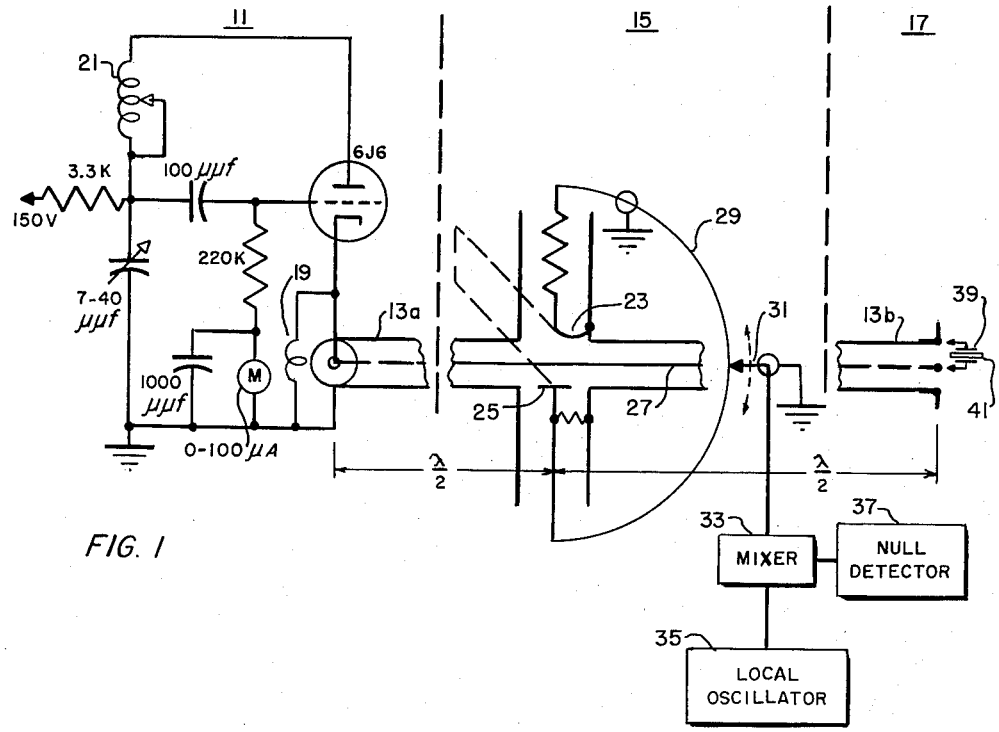
Fig. 1 shows a typical application of the invention.

In Fig. 1 a suitable oscillator 11, which may be controlled by a crystal, is connected to one end of a transmission line 13 of two portions $a$ and $b$, each of a length corresponding to an integral number of quarter wavelengths. A measuring circuit 15 is connected between the two portions of such transmission line, and the crystal control unit 17 is connected to the other end of such line. The oscillator is cathode connected to the transmission line, and included in the cathode circuit is a cancellation coil 19 to eliminate the effect of the shunt capacitance $C_0$ of the crystal unit. The tuner unit 21 in the plate circuit of the oscillator may be adjusted to the general frequency range in which the crystal is expected to oscillate. As shown in the drawings the total transmission line is one wavelength long from the effective point of connection in the oscillator to the effective connection of the crystal unit, and the measuring circuit is connected at the midpoint. Any undesired lead length in the components may be compensated by adjustment of the transmission lines. In this way the connections are effectively the same as tho the oscillator, measuring circuit, and crystal were all connected at the same point. The phase relations at the measuring circuit are reversed as to both voltage and current, but only the impedance is of interest and therefore the reversals are of no significance for the intended purpose. The measuring circuit includes current and voltage probes 23 and 25 loosely coupled to the center conductor 27 of the transmission line to avoid excessive effects on the energy transmitted between the oscillator and crystal. These probes are made adjustable to provide equal output voltages in operation of the system. The outputs from these probes are connected to opposite ends of a phase responsive network including a line 29 and movable probe 31 which can be adjusted to provide a null output during the testing of the crystal unit. A suitable mixer 33, local oscillator 35, and null detector 37 are used to determine the adjustment of the phase responsive network. A suitable crystal mount 39 is used on the transmission line to hold the crystal 41 under test. Since the present system is in part active rather than passive, the crystal must present a suitable impedance to the oscillator to fulfill the necessary loop conditions for oscillation.

This method would ordinarily be used to obtain the circle diagram of a crystal unit. Because of the partly active nature of the circuit, involving the possibility of pulling the oscillator, ordinarily only about three quarters of a circle could be obtained, but this is sufficient for all practical purposes in obtaining the operating parameters of the crystal. The line $13b$ ordinarily would be exactly one half wavelength for the measuring circuit to be the most effective and simple in analyzing the crystal parameters. However, the line $13a$ might vary somewhat to provide a wider range of adjustment in the operation. With quarterwave lines the impedance relations would be inverted and the components would have to be designed for this type of operation. For convenience in terminology both quarter and half wave lines may be considered as impedance inverters, altho the double inversion accomplished by a half-wave line actually restores the original impedance values.

In the actual circuit as shown, the plate tuner unit 21 is a Mallory Inductuner; the lines $13a$ and $13b$ are General Radio type 874 LK; the probes are part of a Hewlett Packard VHF Bridge Model 803; the phase responsive network is an open wire line with two grounded conductors and a center conductor to which the probe is connected; the mixer is a General Radio type 874 MR; the local oscillator 35 is a General Radio type 1208B; the null detector 37 is a General Radio type 1216A; the crystal mount 39 is a General Radio type 874M; and the crystal operates at approximately 178 mc. Many other components would be suitable.

Figure 2:
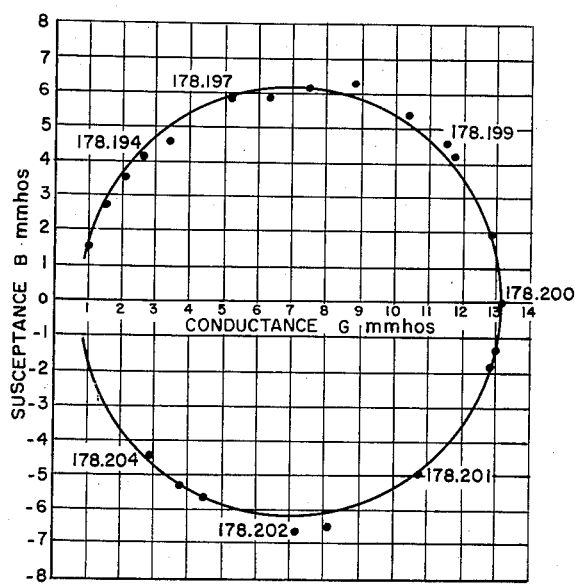
Fig. 2 shows a typical circle diagram of a crystal tested by the invention.

Fig. 2 shows a circle diagram for a crystal unit operating at approximately 178 mc. tested in the circuit of Fig. 1. A few typical values used in plotting the circuit diagram are shown thereon. It will now be apparent that the present system provides for very much simplified testing of crystal units for use at very high and ultra high frequencies in which range the testing previously has been rather burdensome and unreliable.

What is claimed is:

1. Means for measuring the parameters of high frequency oscillating crystal units comprising: an oscillator controllable by a crystal to be tested, an inversion line from said oscillator to said crystal, and means for measuring the relative voltage, current, and phase of the energy in said line to determine the operating parameters of said crystal while said oscillator functions under the control of said crystal.

2. Means for measuring the parameters of high frequency oscillating crystal units comprising: an oscillator controllable by a crystal to be tested, an inversion line from said oscillator to said crystal, an inductance in said oscillator in shunt to said line to compensate the shunt capacity of said crystal, and means for measuring the relative voltage, current, and phase of the energy in said line to determine the operating parameters of said crystal while said oscillator functions under the control of said crystal.

3. Means for measuring the parameters of high frequency oscillating crystal units comprising: an oscillator controllable by a crystal to be tested, an inversion line from said oscillator to said crystal, and means for measuring the relative voltage, current, and phase of the energy in said line to determine the operating parameters of said crystal while said oscillator functions under the control of said crystal, in which the inversion line is an integral number of half wavelengths between the crystal and the point at which the measurement is taken and approximately an integral number of half wavelengths overall.

4. Means for measuring the parameters of high frequency oscillating crystal units comprising: an oscillator controllable by a crystal to be tested, an inversion line from said oscillator to said crystal, an inductance in said oscillator in shunt to said line to compensate the shunt capacity of said crystal and means for measuring the relative voltage, current, and phase of the energy in said line to determine the operating parameters of said crystal, while said oscillator functions under the control of said crystal, in which the inversion line is an integral number of half wavelengths between the crystal and the point at which the measurement is taken and approximately an integral number of half wavelengths overall.

References Cited in the file of this patent

UNITED STATES PATENTS

| | | |
|---|---|---|
| 2,534,224 | Brown | Dec. 19, 1950 |
| 2,615,960 | Erwin | Oct. 28, 1952 |
| 2,624,781 | Bowman | Jan. 6, 1953 |